July 21, 1959 K. R. HALES 2,896,136

SEMICONDUCTOR UNITS

Filed April 23, 1958

INVENTOR.
KENNETH R. HALES
BY
F. D. Prager
ATTORNEY

United States Patent Office 2,896,136

Patented July 21, 1959

2,896,136

SEMICONDUCTOR UNITS

Kenneth R. Hales, Colmar, Pa., assignor to Philco Corporation, Philadelphia, Pa., a corporation of Pennsylvania Application April 23, 1958, Serial No. 730,436

5 Claims. (Cl. 317—234)

Figure 1:
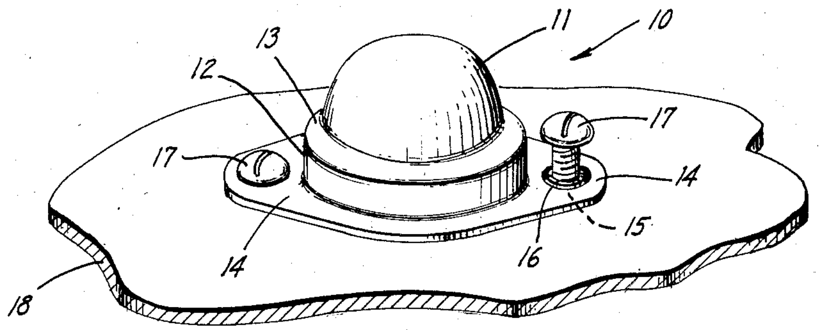

This invention relates to semiconductor units, particularly of the power type. Such units must be hermetically sealed from the atmosphere; and as in their operation appreciable amounts of heat are generated, such heat must be dissipated. Failure to comply very fully with these basic requirements leads to disturbances of operation of the semiconductors and even to possible impairment of their structure. The invention is therefore particularly concerned with encapsulating and heat dissipating means for units of the present type; and it has to do also with further requirements, including the provision of proper electical connections for certain parts of the semiconductor and the firm and permanent mounting thereof.

While hermetically sealed and heat dissipating structures of the present type have heretofore been proposed and used, serious problems have been encountered with them. Electrical connection to certain terminals and/or dissipation of heat from certain points has frequently tended to be less than satisfactory, if encapsulation was adequate, particularly if the mounting of the unit was relatively simple and economical; or the different requirements have conflicted with one another in other ways.

It is accordingly an object of this invention to provide a semiconductor unit wherein all electrical connections are reliable as well as economical, while internally generated heat is reliably dissipated, infiltration of atmospheric contamination is fully avoided, and all other functions are properly performed; all this by inexpensive encapsulating means which also provide for the mounting of the unit.

It has been found important in this connection to realize that certain elements serving as conductors of heat and electricity must, in order to operate as such, be made of a metal such as copper; that such a metal is rather ductile mechanically; and that it accordingly tends to be distorted when exposed to concentrated stress. It is therefore a further object to avoid stress concentrations in such ductile conductors, while positively and firmly pressing such conductors against a "heat sink" element, that is, an element of large thermal mass for dissipating the heat conducted thereto by the ductile conductor.

These and other features will be understood more completely upon a study of the description which follows and of the drawing, wherein the invention is shown as applied to a semiconductor unit of the transistor type.

Figure 2:
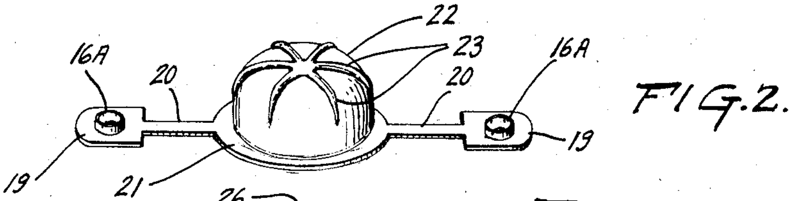
Figure 3:
Figure 4:
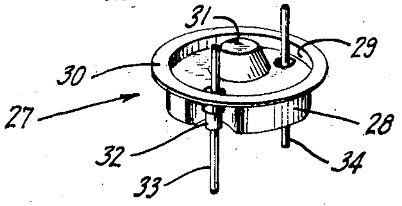
Figure 5:
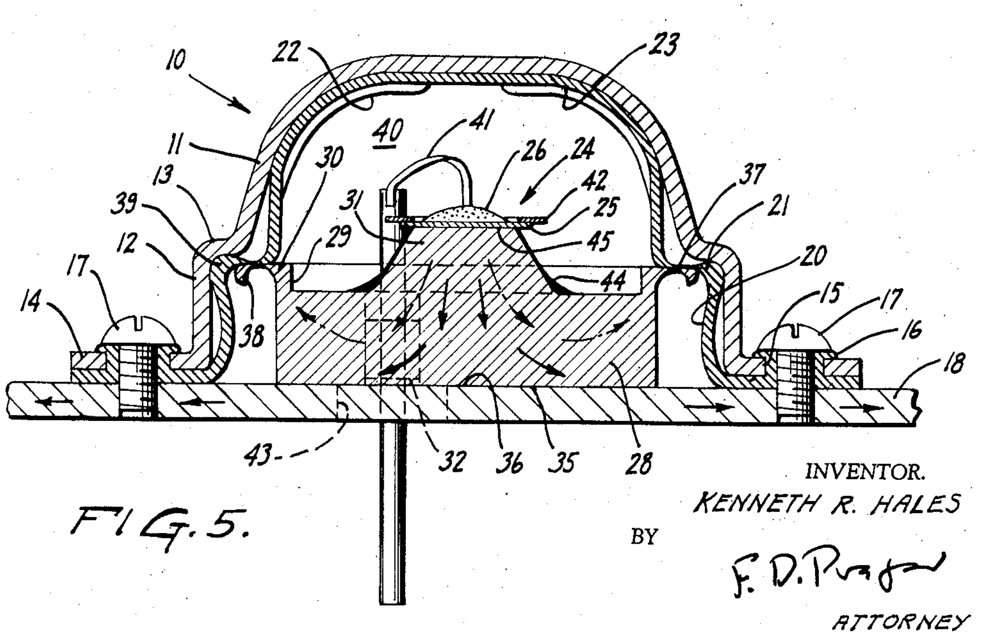

Figure 1 is a perspective view showing the exterior appearance of the unit; Figure 2 is a similar view of a portion of the unit, directly underlying the shell element thereof which is visible in Figure 1, said portion being shown in the form in which it is fabricated and prior to certain bending operations applied to parts thereof in the process of assembly. Figure 3 is a similar view of the transistor itself as fabricated; Figure 4 is a similar view of an electrode connector and support and heat sink element for the transistor, as fabricated; and Figure 5 is a central vertical section through the unit of Figure 1, on an enlarged scale.

The outside appearance of the new unit, as shown in Figure 1, is dominated by a shield or housing 10 having a central dome-shaped portion 11; a somewhat wider annular skirt 12, integrally secured to the bottom edge of the dome by a shoulder portion 13; and a pair of integral ears 14 outwardly extending from the bottom edge of the skirt at positions diametrically opposite one another. A bolt hole 15 is formed in each ear 14 and is peripherally lined by an eyelet 16, forming part of the next underlying element of the semiconductor assembly; the eyelet being engaged by a bolt 17 which is threaded into the metallic support structure or chassis plate 18. The latter plate ultimately receives, from a heat conductor element forming part of transistor housing 10, the heat generated in said housing; and for this purpose the housing is pressed against chassis structure 18 to maintain a close thermal bond between that structure and certain conductor parts interposed between that structure and the housing 10.

In Figure 2 the aforementioned eyelets are shown at 16A in their original form, that is, as ring-shaped upstanding parts of terminal portions 19 of flat strap members 20 extending outwardly from a flange member 21 on a cover or "hat" 22. The hat structure is desirably formed of thin, pure, oxygen-free copper which may be reinforced by ridges 23, while the shield 10 overlying the hat (Figure 1) is desirably formed of mechanically stronger material, such as relatively heavy steel or aluminum sheeting, in order to properly hold and protect the hat and to press it against a transistor electrode connector and support member which in turn is thereby pressed against support 18. The upper, outer configuration of hat 22 and ribs 23 desirably matches the general inner configuration of dome 11, forming part of the rigid shield 10, so that the hat and the overlying dome in effect form a "ball and socket" unit.

Figure 3 shows the semiconductor proper at 24, which comprises a semiconductive wafer 25 and electrode means 26 thereon. The wafer is mounted below hat 22 (Figure 2) and upon a support, connector and heat sink element or member 27, shown in Figure 4. This latter member comprises a block or slug 28 of pure oxygen-free copper, having an outer annular flange 29 upstanding therefrom and an outwardly extending flange 30 on the upper edge of flange 29; the diameter of flange 30 being approximately equal to that of flange 21 on hat 22 and that of shoulder 13 on shield 10. The slug 28 has a frusto-conical boss 31 on the top surface thereof, for mounting the transistor thereon. It further has lead wire seal means 32 incorporated therein between the boss and the flanges, with lead wires 33, 34 insulated by said seal means from the slug metal, held in fixed position relative thereto, and extending from adjacent boss 31 to the outside of the slug. The exposed surfaces of member 27 are desirably covered by a coating of nickel alloy or similar material, not shown and with which the present invention is not concerned.

As shown in Figure 5, ribs 23 of hat 22 are nested intimately into the underside of dome 11, so that when bolts 17, in eyelets 16, are threaded into support plate 18, downward pressure is applied by the underside of the dome to the ribs and substantially uniformly distributed by the hat to the flange structure 21, 30, 29, thus making sure that broad and intimate mechanical and thermal contact is established between a truly flat bottom surface 35 of slug 28—parallel with flange 30—and the flat top surface 36 of support plate 18. In other words, the broadly distributed pressure applied by the shield, hat and flange structure avoids distortion of the bottom of slug 28, although the pressure of mounting bolts 17, directly applied to the periphery of shield 10, is necessarily localized and concentrated in limited areas of said periphery, when only a pair of mounting bolts 17 are used as is desirable for simplicity and economy. While so cooperating in improved mounting arrangements, the thin and ductile sheeting of oxygen-free copper from which hat 22 is made, and which adapts itself readily to the more rigid metal of shield 10, provides better encapsulation than the latter metal could.

Even the copper of slug 28, which is more massive than hat 22, has some appreciable ductility so that the above-mentioned distortion of the bottom of this slug represents a very real danger. As a result, such mountings as have previously been employed for transistor support elements of generally similar types have often maintained less than perfect mechanical contact between the transistor support element and the underlying plate, even when a thermal washer of anodized aluminum or the like was interposed between said element and plate. The new device, by contrast, maintains intimate contact substantially throughout the surfaces 35, 36, and it does so largely by virtue of the broadly distributed pressure employed.

In this connection particular attention is directed to a preferred feature of the flange structure 21, 29, 30, according to which said structure comprises a cold welded area 37 annularly surrounding the slug 28 and hat 22 (Figure 5). In the cold welded area the flange metal is squeezed so as to form a structure of intimately intermingled metal portions of minute thickness, some of the flange metal being extruded as shown at 38 and 39. A hermetic seal around the transistor chamber 40 is thus effected, while avoiding impairment of transistor operation by welding vapors or the like. It must be understood that the strongly and thinly squeezed, cold welded flange area 37 is mechanically very feeble and that accordingly the function of shoulder 13, on housing 10, is not to apply any considerable amount of downward pressure to this cold welded flange structure, although said shoulder may serve to confine the flange structure against irregular distortion, incident to the application of downward pressure derived from bolts 17 and shield 10. This latter pressure is transmitted from shield 10 to the ribs 23 and the vertical walls of hat 22 and thereby, through flanges 21, 30, 29, to the periphery and the body of slug 28.

The construction is completed by connecting each lead wire 33, 34 with suitable portions of transistor 24 (Figure 5) for instance by means including emitter electrode connector means 41 and base holder means 42; the lead wires extending from chamber 40 through seal members 32 and then through apertures 43 in support 18. As indicated at 44 an indium alloy coating is formed on the outside of the boss 31. Desirably, a very thin portion 45 of said coating, on the top surface of boss 31, forms an integral portion of the collector electrode of transistor 24, which portion is alloyed with or otherwise bonded to a portion of the germanium blank 25.

In operation, electrical current flowing through the aforesaid collector electrode 45 tends to generate appreciable heat therein. This heat is dissipated readily as electrode 45 has intimate thermal connection through boss 31, heat sink slug element 28, and surfaces 35, 36 with the ultimate heat sink 18. Additionally, electrical connection is provided between support slug 28 and chassis plate 18 by flange structure 29, 30, 21, connectors 20, 19, 16 and bolts 17, the heads of which are in close frictional contact with the edges of eyelets 16.

The path of thermal flow, insuring dissipation of heat from collector 45, leads through flat bottom surface 35 of slug 28 and into flat top surface 36 of chassis plate 18, as shown by full-line arrows in Figure 5; and the said thermal flow, passing across the flat and mutually contacting surfaces 35, 36, is substantially unimpeded and rapid, by virtue of the undistorted shape of flat surface 35, which is insured by the aforementioned distributed application of pressure in spite of the ductility of slug 28. Even in the presence of a thin layer of metal oxide, oil, enamel plastic or the like, on surface 35 and/or 36—a condition which cannot always be avoided and which in some cases may even be desired—the thermal bond between these surfaces remains excellent, as a rapid and generally substantially conductive flow of heat will take place even across a layer of heat-insulating material, so long as the entire layer is minutely thin and the heat transfer surface extended.

By contrast, the flow of electricity could be seriously impeded by such a layer and particularly, for instance, by a thin coating of metal oxide or the like on chassis plate 18. However, an electrically conductive pathway is safely provided between collector electrode 45 and plate 18 by flange structure 30, 21, straps 20, terminals 19, eyelets 16 and bolts 17. Conductance is provided by the metal-intermingling cold weld, between flange members 30, 21, and also by the frictional pressure joints of bolts 17, which cut into the metal of eyelets 16 and into that of plate 18. Accordingly, electrical current flows, at least to a large extent, through the cold-welded flange structure and the straps on the hat unit, as indicated by broken-line arrows in Figure 5.

Thus it will be seen that according to this invention a hat and flange structure 22, 21 shown in Figure 2, serves the triple purpose of (1) hermetically sealing a transistor chamber 40 from the atmosphere, (2) assisting in the application of broadly distributed mechanical pressure to keep flat bottom surface 35 of slug 28 undistorted for the unimpeded flow of heat to chassis plate 18, and (3) in cooperation with integral straps 20, terminals 19 and eyelets 16—conducting electricity to said chassis plate. These last mentioned strap and terminal elements 20, 19 are almost negligible as to cost, whereas the hat structure and associated parts provide their share of the above-described thermal and electrical connection functions at no cost over and above that which is required for the hermetic sealing of chamber 40.

In previous constructions, the last-mentioned function (3) has been performed by a separate, electrical lead wire, joined to the support slug, for instance by welding, and then passing through an aperture in the slug, filled with electrically insulating, mechanically sealing material such as the glass seals of members 32. Such prior constructions not only involved materially higher cost, they also interfered with the proper performance of the other functions such as (1) and (2), and mainly with the maintenance of broadly distributed pressure, as they tended to make the bottom of the support slug larger and/or more complex. The new construction, by contrast, allows convenient performance of each and all of the widely diversified and highly exacting functions, as described, and it does so by means representing no significant element of the costs of manufacture or operation.

While only a single embodiment of the invention has been shown and described, it should be understood that the details thereof are not to be construed as limitative of the invention, except insofar as is consistent with the scope of the following claims.

I claim:

1. In a semiconductor unit, a support member of copper or the like, said support member having an annular flange around a top surface thereof and having a flat bottom surface spaced from and parallel to said flange; semiconductor means on the top surface of said support member; an integral hat of copper or the like, having a flange cold welded to the flange of said support member, a wall extending upwardly from said flanges and above the semiconductor means, and strap means extending outwardly from the flange of the hat; a rigid shield into which the hat is nested; and bolt means engaging both said shield and said strap means and adapted to engage a flat heat sink member for pressing the shield and hat and thereby, with pressure distributed over said bottom surface, the said bottom surface of the support member against such heat sink member.

2. A unit as described in claim 1 wherein said strap means consists of two straps extending from diametrically opposed portions of the hat and having eyelet means engaging said shield and engaged by said bolt means.

3. A unit as described in claim 1 wherein the semiconductor means is a transistor having a collector electrode in broad contact with the surface of said support member, surrounded by said flanges.

4. In a power transistor unit, a massive collector, heat sink and support slug of high electrical and thermal conductivity and correspondingly high mechanical ductility, said slug having an annular flange extending around one surface thereof, upstanding therefrom and extending outwardly therefrom, said slug also having a flat surface spaced from and parallel to said flange; a transistor wafer on a further surface of said slug surrounded by said flange; a thin-walled cover structure, cold welded to said outwardly extending flange structure, extending above said wafer and also extending outwardly of said flange structure; a rigid shield; and means for pressing the shield against the cover, for thereby pressing the flat surface of the slug against a flat, heat-conductive support with downward pressure distributed over said flat surface, and for electrically connecting the outwardly extending cover structure to said support.

5. A unit as described in claim 4, wherein the shield is also adapted to confine the thin-walled, cold-welded cover structure and flange against lateral distortion incident to the application of said downward pressure.

References Cited in the file of this patent

UNITED STATES PATENTS

| | | |
|---|---|---|
| 2,817,048 | Thuermal et al. | Dec. 17, 1957 |
| 2,853,661 | Houle et al. | Sept. 23, 1958 |